March 17, 1959
L. DANILEWICZ
2,877,755
INERTIA STARTER
Filed March 29, 1954
4 Sheets-Sheet 4
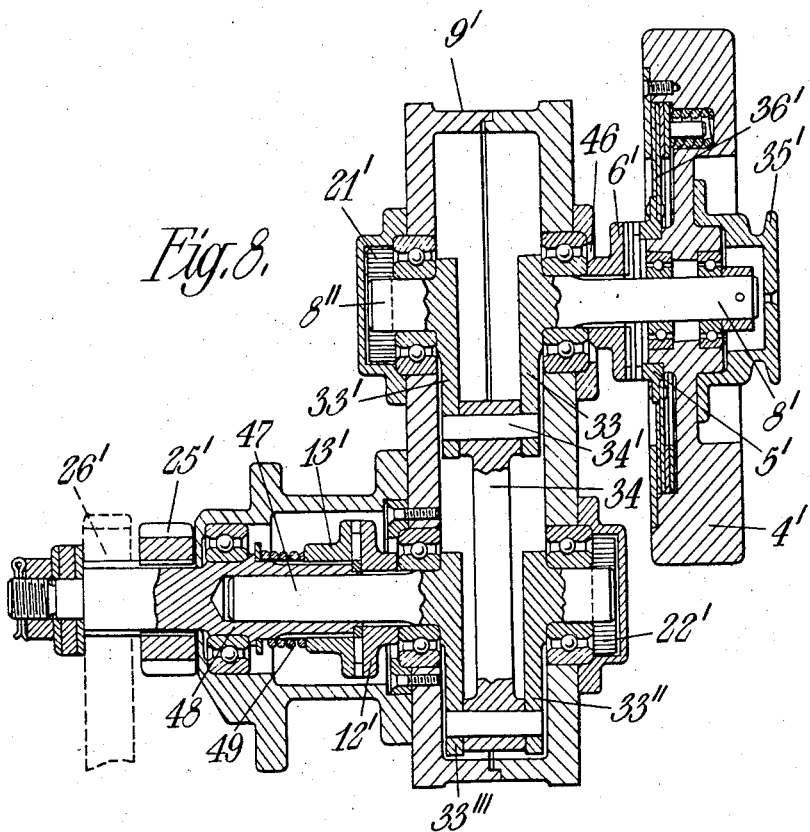
Inventor
L. Danilewicz
By Glascock Downing Seebold
Attys.

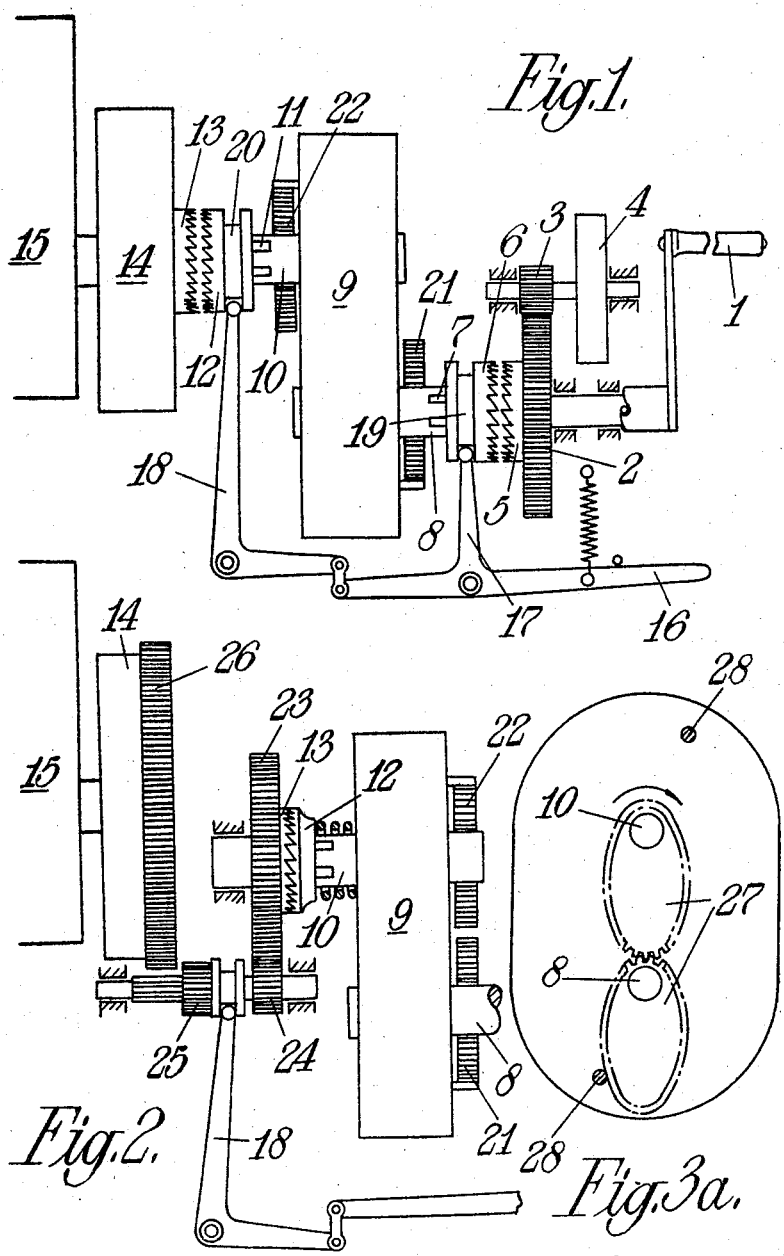

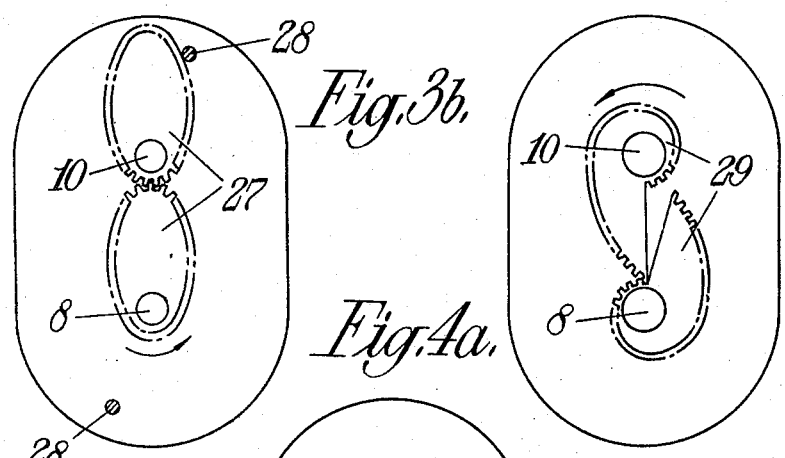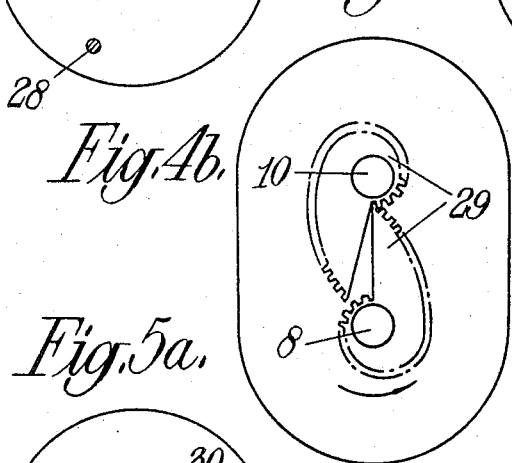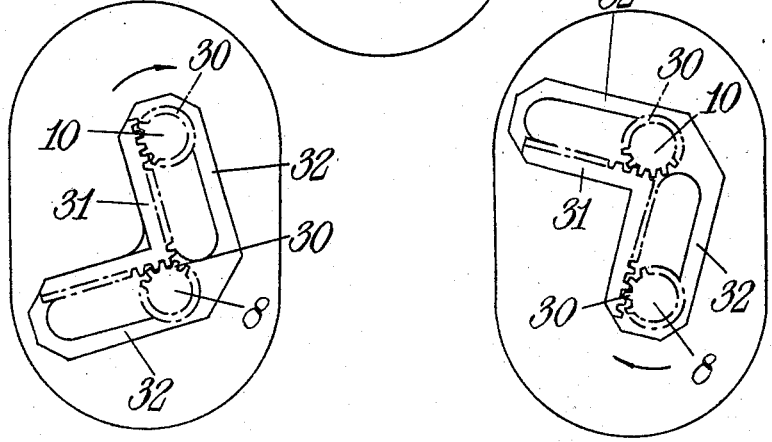

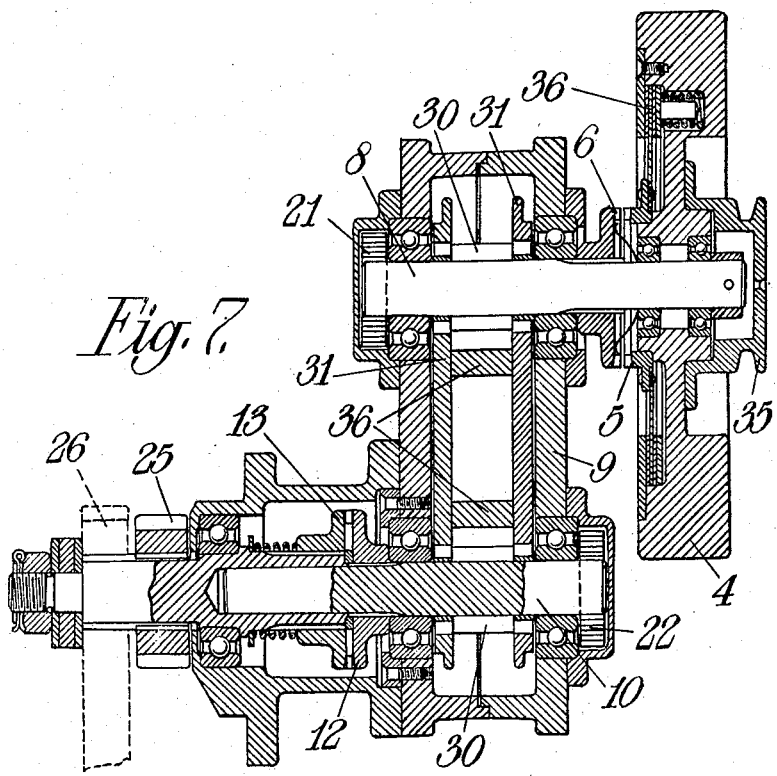
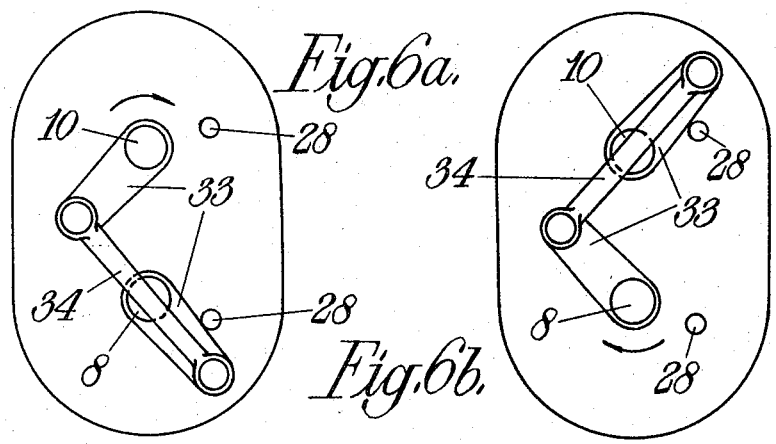

United States Patent Office 2,877,755
Patented Mar. 17, 1959

2,877,755

INERTIA STARTER

Ludomir Danilewicz, Wembley Park, England, assignor, by direct and mesne assignments, to Inertia Starter Developments Limited, London, England Application March 29, 1954, Serial No. 419,291

Claims priority, application Great Britain April 1, 1953

4 Claims. (Cl. 123—179)

This invention consists in means for transferring rotary momentum from one mass to another, comprising a transmission mechanism, input and output members of which are constrained to limited angular movement between extreme configurations with concomitant progressive change in transmission ratio from a starting value exceeding unity to a final value less than unity. Preferably the starting value exceeds 10:1 and may be as high as or higher than 100:1 whilst the final value is preferably less than 1:10 and may be as low as or lower than 1:100.

In one particularly useful kind of arrangement the mechanism is constructed so that if a first flywheel is rotated at high speed and clutched to the input member, a second flywheel coupled by a one-way clutch to the output member is accelerated from rest until the extreme configuration corresponding to the final value of the transmission ratio is reached, when a major part (which may be as high as 90%) of the momentum of the first flywheel has been transferred to the second, and the first brought substantially to rest. Declutching means, which may be automatic, are preferably provided to decouple the first flywheel from the mechanism and permit the latter to be reset by a spring or gravity or other means to its initial configuration.

In some cases the initial and final configurations of the mechanism may be the same, an external constraint such as a stop being provided to prevent overshooting. Where the constraint is fixed, the mechanism will be reset by reversing its movement, but it may be possible instead to lift the constraint at the commencement of each momentum-tranfer operation.

The invention finds particular application to inertia starters for internal combustion engines, especially diesel engines, the output member being, in one arrangement, connected to the usual axially movable pinion for engaging an engine flywheel whilst the input member is connected to the starter flywheel by way of a torque-limiting clutch. The axially movable pinion serves as a one-way clutch in that it disengages automatically from the engine flywheel as soon as the latter assumes a driving relationship therewith.

The inertia starter of this invention affords the high momentum-transfer efficiency associated with variable gears without their attendant disadvantage of low torque transmission and/or rapid wear (in the case of frictional variable gears) or great expense and complexity (in the case of toothed variable gears). The invention does not extend to variable gears having means for automatically changing the gear ratio setting from a high to a low value, but is concerned only with transmission mechanisms in which the change in transmission ratio taking place in operation arises directly from the drive-transmitting movements of the component members.

In one arrangement of inertia starter a first flywheel is coupled to the input member by way of a clutch with or without intermediate gearing, and a second flywheel is coupled to the output member by way of a one-way clutch with or without intermediate gearing. In operation the first flywheel, declutched from the input member, is brought to a high speed by any convenient means, and the clutch is let in. The input and output members then rotate from an initial position to a final position, in the course of which revolution the transmission ratio falls substantially, generally to the inverse of its initial value. At this point the members are brought to rest by locking or by a stop, the one-way clutch between the mechanism and the now spinning second flywheel is overrun, and the clutch between the first flywheel and the mechanism is disengaged automatically by any convenient means to permit the latter to be reset by a return spring.

According to the invention the input and output members are coupled together by a coupling member arranged to rotate about a moving axis. Thus, in the case where the members are parallelly aligned laterally spaced pinions, the coupling member may comprise a rack having two limbs set at an angle to one another, suitably 90°. If then, in the initial and final positions, one of the pinions is closely adjacent to this angle, the initial and final values of the gear ratio will be practically 00:1 and 1:00 respectively, the amount of resiliency needed to accommodate the maximum (initial) torque being very small.

Each rack is conveniently mounted on an arm of a flat L-shaped plate with its teeth facing a slot extending along most of the length of the respective arm. The pinions are constrained to engage with the racks each by a coaxially mounted roller engaged in the respective slot. The slots extend so that each pinion can, in turn, occupy a position close to the angle of the L-shaped plate. If desired, the racks may stop short at one end so that the pinions run free in the configuration assumed at the end of a momentum-transfer operation, or alternatively the racks may run for the full length of travel permitted, suitable clutches being provided to prevent jamming.

If the pinions are equal and of small radius compared with their lateral separation, and are coupled to flywheels of equal inertia it can readily be shown that the rotation of the racks during momentum transfer is substantially constant, giving a smooth operation.

Thus, with pinions of unit radius and relatively great separation $a$, the distance of the points of contact of the pinions and the associated racks from the 90° angle between the racks are $a \cos \alpha$ and $a \sin \alpha$ where $\alpha$ is the angle between the line joining the pinions and one of the racks. If the angular velocity of the pinion at the angle $\alpha$ is $\omega_1$, and that of the other is $\omega_2$, it follows that $$d/dt \, a \cos \alpha = -\omega_1$$

and $$d/dt \, a \sin \alpha = \omega_2$$

or $$\omega_1 = a\dot\alpha \sin \alpha \text{ and } \omega_2 = a\dot\alpha \cos \alpha$$

Since no energy is lost, and the flywheel masses are equal, the sum of $$\omega_1^2$$

and $$\omega_2^2$$

is constant, and substitution of $a\dot\alpha \sin \alpha$ and $a\dot\alpha \cos \alpha$ for $\omega_1$ and $\omega_2$ shows that $\dot\alpha$ is constant. Further, differentiation of the equation for $\omega_1$ shows that $\dot\omega_1 = a\dot\alpha^2 \cos \alpha$, and substitution for $a\dot\alpha \cos \alpha$ from the equation for $\omega_2$ gives $\dot\omega_1 = \dot\alpha\omega_2$. This last equation shows that the acceleration of the second flywheel has its highest value at the beginning of a momentum-transfer operation, and is finite, being $$\omega_2^2 \times \frac{1}{a}$$

The above calculation is only approximate and neglects the inertia of the gears, but the discrepancy can readily be accommodated by the slight resiliency of the mechanical parts.

In another arrangement incorporating a coupling member arranged to rock and rotate about a moving axis, the coupling member is in the form of a connecting rod having an eccentric pivotal connection to the input and to the output members, the axes of the latter being parallel and laterally spaced. Preferably, in the initial position, the axis of the connecting rod passes close to (including through), the axis of the input member whilst in the final position it passes close to that of the output member, giving respective transmission ratios approaching 00:1 and 1:00.

It will be understood that the expression "connecting rod" is not limited to rod-like structures.

Various embodiments of the invention are illustrated in the accompanying drawings, of which:

Figure 1 is a general diagrammatic view of an inertia starter arranged for coaxial clutching to an engine crankshaft, Figure 2 shows a modification of part of Figure 1, where clutching to the engine crankshaft is by way of an axially movable pinion.

Figures 3a, 4a, 5a and 6a show diagrammatically the internal mechanism of alternative gearboxes forming a part of Figure 1 or 2, in the initial position, Figure 3b, 4b, 5b and 6b show the internal mechanism of the respective gearboxes in the final position, Figure 7 is a sectional view of a practical arrangement, and Figure 8 is a view similar to Figure 7, by illustrating another practical arrangement of the invention.

The inertia starter shown in Figure 1 comprises an operating handle 1 for turning spur wheel 2 which forms, with a pinion 3, a step-up gear for driving a light flywheel 4. Constrained to rotate with spur wheel 2 is one half 5 of a non-reversible claw clutch, the complementary half 6 of which is coupled by pins 7 to the input member 8 of a gearbox 9. The output member 10 of the gearbox is similarly coupled by pins 11 to one half 12 of a second non-reversible claw clutch, the complementary half 13 of which is constrained to rotate with the flywheel 14 of a diesel or other heat engine 15. Handle 16 serves simultaneously to engage clutch members 12, 13 and 5, 6 when starting the engine, and subsequently to disengage them, by means of levers 17 and 18 engaging in respective annular grooves 19, 20 on the clutch members. Flat spiral springs 21, 22 serve to reset the gear members in box 9 to their initial position after a starting operation.

In the modified arrangement of Figure 2, a step-up gear 23, 24 is provided between output member 10 and an axially movable pinion 25 adapted to be slid by lever 18 into engagement with spur teeth 26 formed on flywheel 14. Clutch members 12, 13 are spring-loaded and permanently in engagement serving as a ratchet whilst pinion 25 serves to disconnect box 9 from flywheel 14.

The gears in box 9 may have any of the constructions shown in Figures 3 (a, b) to 6 (a, b). Figures 3a and 3b, oval gears 27 mounted on input and output shafts 8 and 10 are in direct engagement, their rotation being limited by stops 28. It will be appreciated that only about half the periphery of gears 27 need be toothed, as each makes only a half revolution. In Figures 4a and 4b, single turn spiral gears 29 are employed and, as these lock in the initial and final positions, stops 28 may be omitted. In Figures 5a and 5b, pinions 30 are mounted on shafts 8 and 10, and are in engagement with an L-shaped rack 31. The teeth of rack 31 are held against pinions 30 by engagement of arms 32 carried by the rack, against the opposite side of shafts 8 and 11. In Figures 6a and 6b, arms 33 are mounted on shafts 8 and 10, and linked eccentrically by connecting rod 34, arranged to intersect the axis of shafts 8 and 10 respectively in the initial and final positions to give respective gear ratios of 00:1 and 1:00 respectively. In this form, the arms 33 represent part of the input and output means of the gear means in box 9, while the connecting rod 34 is a rigid floating coupling member eccentrically connected with the arms 33. The arms 33 also define the generators of these eccentric pivotal connections.

A practical arrangement corresponding to Figure 5a is shown in Figure 7. A starter flywheel 4 is attached to a pulley 35 and linked by way of a torque-limiting device 36 to a clutch member 5. The latter can be slid by an external control (not shown) bodily with flywheel 4 into engagement with clutch member 6 splined onto input shaft 8. Rack 31 is duplicated, the two being held together by bridge pieces 37. Clutch members 12, 13 are mounted on output shaft 10, essentially as shown in Figure 2, member 13 being spring-loaded, but gear 23, 24 is dispensed with. Pinion 25 is in screw threaded engagement with shaft 10, so as to be thrown forward into engagement with spur teeth 26 when shaft 10 is first revolved and to be thrown back when overrun by teeth 26. Pulley 35 is connected by a belt to a further pulley on a winding handle (not shown).

The starter illustrated in Figure 7 was fitted to a standard Ford tractor 4 cycle diesel engine of cylinder bore 3.940", stroke 4.250" and compression ratio 16:1. This engine has a flywheel which, together with other revolving parts, represents a moment of inertia of 15.88 lb./inch/sec.$^2$. The inertia mass used in the starter was a flat rim of mild steel 7⅞" external diameter, 4¾" internal diameter and 1⅜" wide. It was driven by a hand winding gear of 1:45 ratio and required 4 seconds winding by an average man to attain 2,400 R. P. M., at which reliable engine starting was achieved at an ambient temperature of 40° F. By comparison, using a flywheel engaged by way of a torque-limiting clutch and through invariable gearing to an axially movable pinion, it required 30 seconds of continuous winding effort to achieve equally reliable starting at the same temperature and with the same engine.

Figure 8 is a view similar to Figure 7 by illustrating the gear means of Figures 6a and 6b in a practical embodiment. In the Figure 8 the starter flywheel 4' is rotatably mounted on a portion 3' of the input means in the gear box 9'. A pulley 35' is attached to the starter flywheel. The flywheel further houses a torque limiting or shock absorbing device 36', which is connected to a clutch member 5'. The clutch member 5' is one jaw of a ratchet type or one-way clutch. This member is axially fixed. A complementary jaw member 6' is splined to the shaft portion 8' and has an external annular groove 46 for accommodating the forked end of a suitable control lever, not shown, whereby the clutch members 5' and 6' can be engaged to transmit rotation from the flywheel to the input means within the gear box. One the inner end of shaft portion 8' is a crank arm portion 33. The complementary portion 33' being secured to the inner end of a stub shaft portion 8" that is also journalled within the gear box. A connecting rod 34 is coupled to the outer ends of the arms 33, 33' by pin means 34'. The other end of the connecting rod is coupled by similar pin means to additional arms 33" and 33"' forming part of the output means within the gear box. One clutch member 12' is splined to the shaft portion 47, while a complementary clutch member 13' is splined to a hollow shaft portion 48. A spring means 49 spring loads clutch member 13' so that they are in engagement. The pinion 25' is axially movable along the outer end of shaft portion 48 for engagement with spur teeth 26' because the outer surface of shaft 48 and the interior of pinion 35' are in threaded engagement. The spiral spring means 21', 22' reset the input and output means within the gear box to their initial position after a starting operation. As apparent from Figures 6a and 6b, the pair of arms 33, 33' and the other pair of arms 33" and 33"' define the generators or generatrices of the eccentric pivotal connections to the opposite ends of the connecting rod 34, since the generator or generatrix is a line joining the center of an eccentric pivotal connection to the center of rotation, as shown in Figures 6a and 6b.

I claim:

1. An inertia starter comprising a flywheel, drive means for revolving the flywheel, a rotary input means, a clutch operative between said flywheel and input means, a rotary output means for engaging with an engine crankshaft, a connecting rod means between said input and output means including an eccentric pivotal connection between said rod and input means and an eccentric pivotal connection between said rod and output means, the generator of the pivotal connections being at an angle with each other, said pivotal connections being spaced apart and the axes of said input and output means being parallel and spaced apart, said pivotal connections being arranged to rotate said connecting rod in transmitting drive from said input to said output means, with a concomitant desired change in gear ratio, and disengageable crankshaft driving means connected with said output member for cranking an engine to be started.

2. An inertia starter as set forth in claim 1 wherein said eccentric pivotal connections are disposed so that when one is located in a line passing through the axes of the input and output means, the generator of the other eccentric pivotal connection is at right angles to said line.

3. An inertia starter comprising a flywheel, a drive for revolving the flywheel, an engine-engaging pinion, gear means operative between the flywheel and pinion, and clutch means operative between the flywheel and gear means, in which said gear means comprises a rotary input means coupled to said clutch means, a rotary output means coupled to said pinion, and a rigid, floating coupling means eccentrically engaged with said input and output means respectively, and arranged to rock and rotate about a moving axis in transmitting drive from said input to said output means.

4. An inertia starter according to claim 3 in which said coupling means comprises an L-shaped rack means and said input and output means comprise pinions engaged with respective arms of said rack means.

References Cited in the file of this patent

UNITED STATES PATENTS

| | | |
|---|---|---|
| 1,679,602 | Chilton | Aug. 7, 1928 |
| 2,014,258 | Lansing | Sept. 10, 1935 |
| 2,017,464 | Lansing | Oct. 15, 1935 |
| 2,131,288 | Kirkpatrick | Sept. 27, 1938 |

OTHER REFERENCES

Elements of Mechanism (page 239), 1930 (Schwamb, Merrill, James). (Copy in Div. 12.)